(12) United States Patent
Krishnan et al.

(10) Patent No.: US 8,341,344 B2
(45) Date of Patent: Dec. 25, 2012

(54) TECHNIQUES FOR ACCESSING A RESOURCE IN A PROCESSOR SYSTEM

(75) Inventors: Guhan Krishnan, Chelmsford, MA (US); John Kalamatianos, Arlington, MA (US)

(73) Assignee: GLOBALFOUNDRIES Inc.

( * ) Notice: Subject to any disclaimer, the term of this patent is extended or adjusted under 35 U.S.C. 154(b) by 1495 days.

(21) Appl. No.: 11/859,044

(22) Filed: Sep. 21, 2007

(65) Prior Publication Data

US 2009/0083741 A1   Mar. 26, 2009

(51) Int. Cl.
G06F 12/00 (2006.01)
G06F 9/46 (2006.01)

(52) U.S. Cl. ........ 711/105; 711/111; 711/150; 711/151; 718/102

(58) Field of Classification Search ................ 711/105, 711/111, 150, 151; 718/102
See application file for complete search history.

(56) References Cited

U.S. PATENT DOCUMENTS

| 6,747,912 B1 | 6/2004 | Riesenman | |
|---|---|---|---|
| 2007/0168616 A1* | 7/2007 | Jeddeloh | 711/118 |
| 2009/0044189 A1* | 2/2009 | Mutlu et al. | 718/102 |

* cited by examiner

*Primary Examiner* — Yaima Campos
*Assistant Examiner* — Mehdi Namazi

(57) ABSTRACT

A technique of accessing a resource includes receiving, at a master scheduler, resource access requests. The resource access requests are translated into respective slave state machine work orders that each include one or more respective commands. The respective commands are assigned, for execution, to command streams associated with respective slave state machines. The respective commands are then executed responsive to the respective slave state machines.

18 Claims, 3 Drawing Sheets

TECHNIQUES FOR ACCESSING A RESOURCE IN A PROCESSOR SYSTEM

BACKGROUND

1. Field of the Disclosure

The present disclosure is generally directed to a processor system and, more particularly, to techniques for accessing a resource in a processor system.

2. Description of the Related Art

In a typical computer system, memory controllers are implemented within a Northbridge chip (integrated circuit (IC)) or within a central processing unit (CPU) chip (in order to reduce memory latency). In general, memory controllers manage the flow of data to/from a memory. Dynamic random access memory (DRAM) controllers contain logic necessary to read data from and write data to DRAM modules and to refresh the DRAM modules. As is well known, without periodic refreshes, DRAM modules lose written data, as capacitors internal to the DRAM modules leak current. Memory controller bus widths have ranged from 8-bits (in relatively simple memory subsystems) to 256-bits (in more complicated memory subsystems and video cards). In a typical computer system, DRAMs are organized in channels of dual in-line memory modules (DIMMs), with each DIMM supporting some number of ranks (or chip selects) and each chip select some number of banks. In general, such an organization increases the command and data bandwidth of a memory subsystem by supporting multiple parallel transactions to different DRAM banks.

Typically, computer systems that have employed conventional memory controllers have implemented relatively complex logic to control access (i.e., schedule commands on a DRAM bus) to all DRAM modules that may be present in a computer system, even when one or more DRAM module slots are not populated in the computer system. In a typical application, a memory controller has attempted to schedule commands on the DRAM bus to maximize data bandwidth, reduce bus turn-around time, and minimize latency associated with reads/writes from/to memory. To efficiently access DRAM, memory controllers have usually performed out-of-order scheduling of requests (e.g., reads/writes). In general, conventional DRAM scheduling algorithms have attempted to choose a best possible DRAM command stream by tracking a state that corresponds to a maximum channel configuration (i.e., conventional DRAM controllers have employed a flat structure). Using this approach has required relatively complex scheduling logic that has generally consumed a relatively large die area (and correspondingly has increased power requirements). Typically, reads/writes to an active (open) page or row of a memory bank (i.e., page hits) have been given priority over reads/writes to an inactive (closed) page or row of a memory bank (i.e., page misses), which have been given priority over reads/writes to a page or row of a memory bank that is different from a currently active (open) page or row (i.e., page conflicts) of the memory bank.

What is needed is a scalable dynamic random access memory (DRAM) scheduling technique (for accessing DRAM present in a processor system) that readily facilitates tracking less than a maximum channel configuration when desired.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
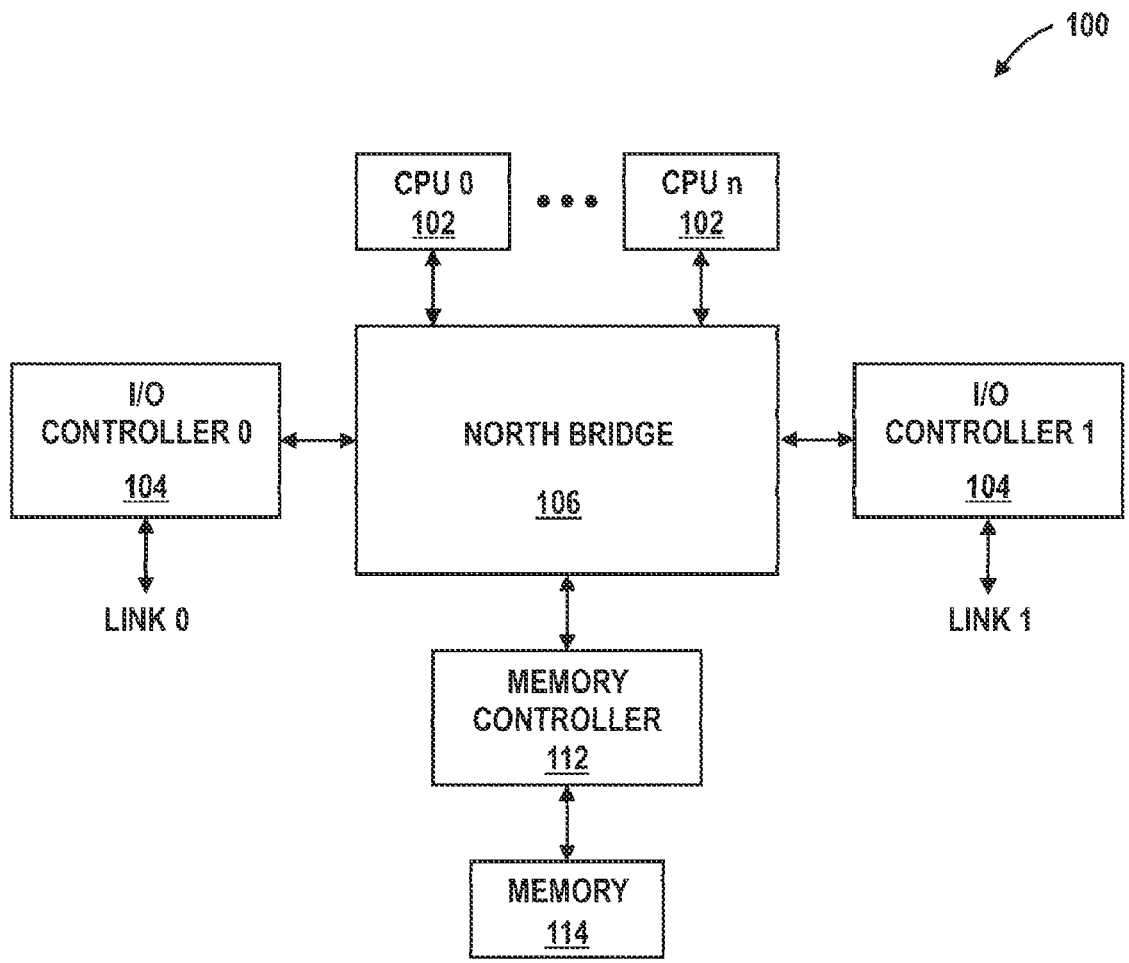
FIG. 1 shows an example electrical block diagram of a processor system that may be configured according to various embodiments of the present disclosure.

The techniques disclosed herein generally facilitate better utilization of a dynamic random access memory (DRAM) among devices (e.g., one or more central processing units (CPUs), one or more input/output (I/O) virtual channels, or other system components) that are capable of generating system operations (e.g., reads/writes to memory, I/O, etc.). For example, it is contemplated that the techniques disclosed herein may be employed in any number of devices, e.g., computer systems, switches, bridges, etc., that utilize a memory controller to access DRAM. As used herein, the term "coupled" includes both a direct electrical connection between elements (or blocks) and an indirect electrical connection between elements (or blocks) provided by one or more intervening elements (or blocks).

As is also used herein a "master scheduler" is a unit which receives incoming DRAM requests, houses a page table (whose functionality is further described below), and prioritizes, re-orders, and picks a given sequence of DRAM requests that maximizes a DRAM bandwidth. For example, a master scheduler may determine that the best sequence of DRAM request to pick from may correspond to opening an inactive page (e.g., chip select 0, bank 0, row 0) and issuing several DRAM read or writes as page hits to the chip select/bank. Alternatively, the master scheduler may choose to close an active page (e.g., chip select 0, bank 2, row 5) and open a new row (e.g., row 6) and then perform a sequence of read or write commands. In any case, it is desirable to be able to perform these types of sequences to different chip selects/banks simultaneously to efficiently process incoming DRAM requests. To efficiently process incoming DRAM requests, two basic building blocks, i.e., slave state machines and context queues which are defined in subsequent paragraphs, are employed. As used herein, the term "state machine" means sequential logic that transitions from a current state to a next state based on one or more inputs.

As is also used herein, the term "slave state machine" is a generic resource that can be bound to any rank (chip select)/bank path and that houses logic to perform various DRAM commands and meet all time relationships required for transactions on the DRAM bus. In general, each DRAM request is translated into a work order of some combination of commands (e.g., a read/write (with or without autoprecharge), an activate-read/write (with or without autoprecharge), or a precharge-activate-read/write (with or without autoprecharge)) that the slave state machine executes. Slave state machines are generic resources that can be bound to different DRAM ranks (chip selects)/banks over time, but each of the slave state machines can only be bound to one DRAM chip select/bank at any given point in time. As used herein a "context queue" is a communication conduit between a master scheduler and a slave state machine that may include one or more entries. A context queue attempts to sequence commands to active slave state machines and selects an available slave state machine (when one is or becomes available) for binding to a new command, when the new command does not already correspond to an active slave state machine. In broad terms, the disclosed techniques provide a boundary and mechanism for scheduling commands between a master scheduler and slave resources.

According to one embodiment of the present disclosure, a technique of accessing a memory, includes receiving, at a master scheduler, resource access requests, e.g., DRAM read/write requests. The resource access requests are translated into respective slave state machine work orders that each include one or more respective commands, and are assigned, for execution, to command streams associated with respective slave state machines. The one or more respective commands are then executed, i.e., at a later point in time, responsive to the respective slave state machines.

According to another embodiment of the present disclosure, a memory controller includes a master scheduler and multiple slave state machines. The master scheduler is configured to translate memory transaction requests into respective commands and assign associated ones of the respective commands to a same one of respective command streams. The multiple slave state machines are coupled to the master scheduler and each of the multiple command streams is associated with one of the multiple slave state machines.

According to another aspect of the present disclosure, a processor system includes a central processing unit and a memory controller. The memory controller is coupled to the central processing unit and includes a master scheduler and multiple slave state machines. The master scheduler is configured to translate memory transaction requests into respective commands and assign associated ones of the respective commands to a same one of multiple command streams. The multiple slave state machines are coupled to the master scheduler and each of the respective command streams is associated with one of the multiple slave state machines.

With reference to FIG. 1, an example processor system 100 is illustrated that includes multiple central processing units (CPUs) 102, multiple input/output (I/O) controllers 104, a Northbridge 106, a memory controller 112, and a memory 114, which includes an application appropriate amount of dynamic random access memory (DRAM). The system 100 may also include I/O devices coupled to the I/O controllers 104. The I/O devices may be, for example, a hard-drive, an I/O port, a network device, a keyboard, a mouse, a graphics card, etc. As is shown, the memory (shared system resource) 114 is coupled to the memory controller 112. The memory controller 112 may, more broadly, be considered a resource scheduler. While only two of the CPUs 102 are depicted in FIG. 1, it should be appreciated that the techniques disclosed herein are broadly applicable to processor systems that include more or less that two CPUs, each of which may have one or more levels of internal cache. Similarly, while only two I/O controllers 104 are depicted in FIG. 1, it should be appreciated that the techniques disclosed herein are broadly applicable to processor systems that include more or less that two I/O controllers.

The memory controller 112 may be, for example, a dynamic random access memory (DRAM) controller and, in this case, the memory 114 includes multiple DRAM modules. The memory controller 112 may be integrated within the Northbridge 106 or may be located in a different functional block of the processor system 100. The I/O controllers 104 may take various forms. For example, the I/O controllers 104 may be HyperTransport™ controllers. In general, the system 100 includes various devices that read/write information from/to the memory 114. In a typical implementation, the memory 114 is partitioned into a number of different rank/bank pairs, where the rank corresponds to a chip select. For example, a DRAM channel may have a maximum of four ranks per channel with eight banks per rank, which corresponds to thirty-two independent information states that need to be tracked to choose an incoming request schedule that provides an optimal performance. In one or more embodiments, the processor system 100 may implement more than one DRAM channel and the memory controller 112 may be configured to track less than the maximum number of independent information states.

Figure 2:
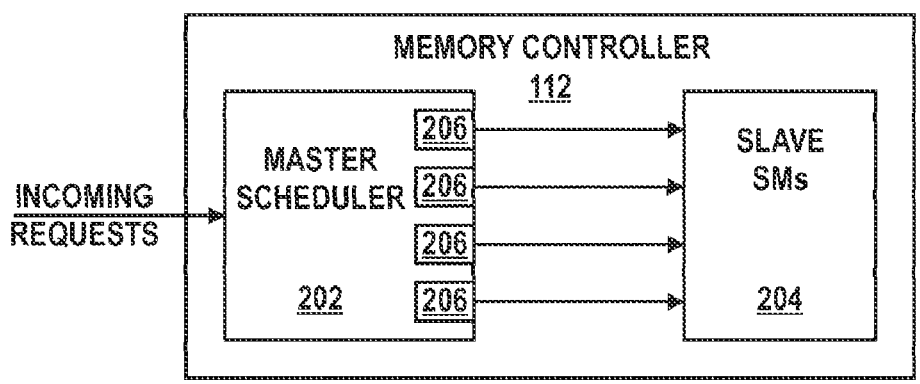
FIG. 2 shows an example electrical block diagram of a memory controller configured according to one embodiment of the present disclosure.

With reference to FIG. 2, the memory controller 112 includes a master scheduler unit (master scheduler) 202 that receives incoming requests, e.g., dynamic random access memory (DRAM) read and write requests. In a typical implementation, an incoming request includes an associated rank address, an associated bank address, an associated row address, an associated column address, an indication of whether the request is a read or a write, and associated data (when the incoming request corresponds to a DRAM write). The master scheduler 202 translates the incoming requests into DRAM commands and, when the commands correspond to a currently active rank/bank, assigns the DRAM commands to one of multiple context queues 206, each of which are used to queue a different command stream and which correspond to a different assigned slave state machine (see FIG. 3) located within a slave state machine (SM) unit 204. Each of the SMs, within the unit 204, implement a memory appropriate communication protocol.

On the other hand, when an incoming request does not correspond to a currently active rank/bank, the master scheduler 202 assigns (according to an implemented assignment approach, e.g., an "oldest ready" assignment approach) DRAM commands associated with the incoming request to a slave SM when one becomes available. In general, the master scheduler 202 maintains information on previous commands scheduled. The master scheduler 202 selects requests to service, based on a transaction state of chip select (rank)/bank pairs of an associated memory. In a typical implementation, each of the one or more entries of the context queues 206 are bound to a given rank/bank of a memory for a time-slot, whose duration may change based on a scheduling algorithm implemented by the master scheduler 202. It should be appreciated that the number of slave SMs is scalable to achieve a desired performance. For example, a memory controller having eight slave SMs would generally have a higher performance than a memory controller with four slave SMs, albeit with higher power requirements.

Figure 3:
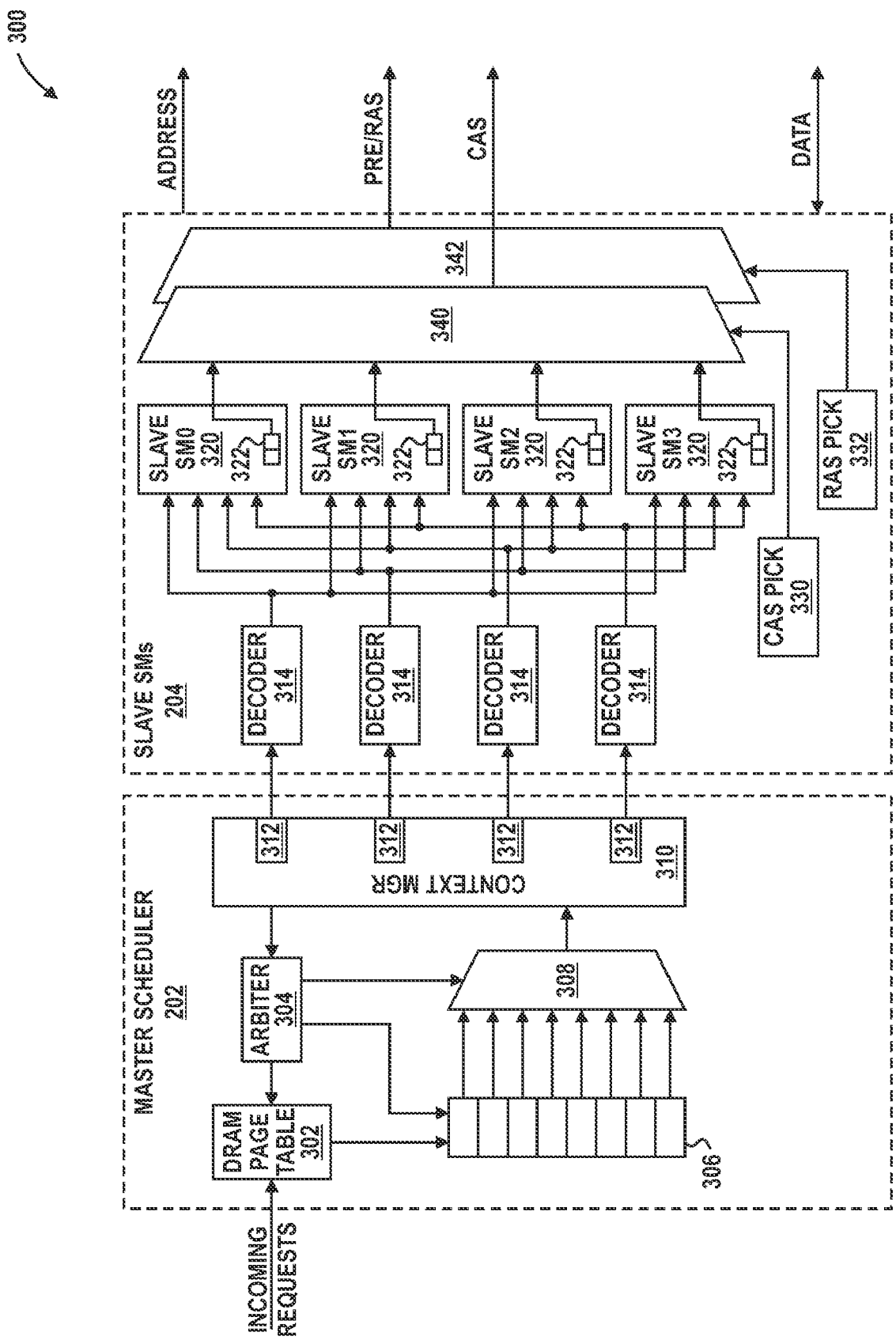
FIG. 3 shows an example electrical block diagram of the memory controller of FIG. 2 in further detail.

With reference to FIG. 3, a resource access circuit 300 includes the master scheduler 202 and the slave SM unit 204. In this embodiment, the master scheduler 202 includes a DRAM page table 302 that receives incoming requests, e.g., DRAM reads and writes. The page table 302 stores various information that the page table 302 utilizes to determine what command to associate with an incoming request. For example, the page table 302 maintains information as to what memory pages are currently open (i.e., the page table 302 tracks active pages by rank/bank/row and what slave SMs 320 are currently assigned to a command stream (i.e., a context queue 312). The page table 302 utilizes the information to determine what command to associate with an incoming request. For example, if a page at rank 2/bank 3/row 5 is currently open and the incoming request corresponds to a read of a page at rank 2/bank 3/row 7, the page at rank 2/bank 3/row 5 will be closed (depending on the availability of the slave SMs 320) so that the page at rank 2/bank 3/row 7 may be opened. In this case, the page table 302 provides a command (i.e., appropriate command bits) to precharge (i.e., close) rank 2/bank 3/row 5, activate (i.e., open) rank 2/bank 3/row 7, and read desired information (in this case a precharge-activate-read command sequence). As another example, if a page at rank 2/bank 3/row 5 is currently open and the incoming request corresponds to a read of a page at rank 2/bank 3/row 5, the information can be read (using a read command) by providing an appropriate column address without opening or closing a new page.

It should be appreciated that a work order may include information in addition to a DRAM command, e.g., a tag that indicates a related size of the DRAM command (such as a 32-byte read, a 64-byte read, a 128-byte read, a 256-byte read, etc.). Moreover, a work order for one or more DRAM commands may be encoded in any number of different formats. In general, the DRAM commands are atomic in that the DRAM commands are completed in order. As one example, four bit codes may be employed in a work order to implement the following DRAM commands: 1000 corresponds to precharge; 0010 corresponds to activate-read, 0011 corresponds to activate-write; 0110 corresponds to activate-read with autoprecharge; 0111 corresponds to activate-write with auto-precharge; 1010 corresponds to precharge-activate-read; 1011 corresponds to precharge-activate-write; 1110 corresponds to precharge-activate-read with autoprecharge; and 1111 corresponds to precharge-activate-write with autoprecharge. In this embodiment, reads and writes to memory pages that are already open may use a four bit code that is not already utilized (e.g., 0000, 0001, 0100, etc.).

In at least one embodiment, the page table 302 inserts commands (i.e., appropriate command bits) in a designated location (with respect to other information provided in the incoming request) in an entry of input queue 306, which may be, for example, a 16-entry queue. In this case, the page table 302 evaluates the incoming request and selectively updates command related information in the entry of the input queue 306, based on the information maintained in the page table 302. An arbiter 304 is coupled to the page table 302, the input queue 306, and a select line of multiplexer 308. The arbiter 304 may employ various algorithms to select commands from the input queue 306. A selected command is transferred to context manager 310, which assigns the selected command to one of the context queues 312. An assigned one of the context queues 312 holds a sequence of outstanding or unfinished work orders for an associated one of the SMs 320. When the outstanding work orders for an assigned one of the context queues 312 complete and there are no more requests from the master scheduler 202 that correspond to the sequence, the assigned one of the context queues 312 may be deallocated. In at least one embodiment, the context manager 310 modifies a command, e.g., by inserting one or more routing bits, such that a command is routed to an assigned one of the SMs 320.

Each of the context queues 312 are assigned, by the context manager 310, to one of the SMs 320, e.g., for one or more time slots. Decoders 314 route the commands from the context queues 312, based on assignments of the SMs 320. Outputs of each of the decoders 314 are coupled to respective inputs of each of the slave SMs 320. Each of the slave SMs 320 include respective context queues 322, e.g., two entry queues, for queuing commands prior to their execution. It should be appreciated that the queues 322 may have more or less than two entries, depending upon a performance level desired. In general, the SMs 320 perform commands, in a specific order, as part of a work order from an associated one of the context queues 312. For example, a precharge-activate-read command is performed in the following order: precharge of a given chip select/bank; activation of a new row; and reading starting with a column address for a given size. Outputs of the SMs 320 are coupled to inputs of multiplexer 340 and inputs of multiplexer 342. Outputs of the multiplexer 340 provide column address strobe (CAS) signals and outputs of the multiplexer 342 provide either precharge (PRE) signals or row address strobe (RAS) signals to the memory 114 responsive to a CAS pick block 330 and a RAS pick block 332.

The CAS and RAS pick blocks 330 and 332 may employ, for example, an "oldest ready" technique when choosing which of the SMs 320 is allowed to provide a PRE/RAS or a CAS. Alternatively, the PRE/RAS and CAS from one of the SMs 320 may be assigned a higher priority than one or more remaining ones of the SMs 320. In a typical implementation, the CAS and RAS pick blocks 330 and 332 attempt to pick every cycle there is a valid CAS or a PRE/RAS request from one of the SMs 320. In at least one implementation, a CAS has a higher priority than a RAS or a precharge (PRE). While only four slave SMs are shown in FIG. 3, it is contemplated that more and less than four slave SMs may be employed in a resource controller constructed according to various aspects of the present disclosure. For example, in a system that implements a memory having four ranks and eight banks per rank, up to thirty-two slave SMs may be employed. It should be appreciated that a lower power, reduced area resource controller may be implemented by employing less than thirty-two slave SMs for a memory having four ranks and eight banks per rank (albeit at a lower performance level).

Figure 4:
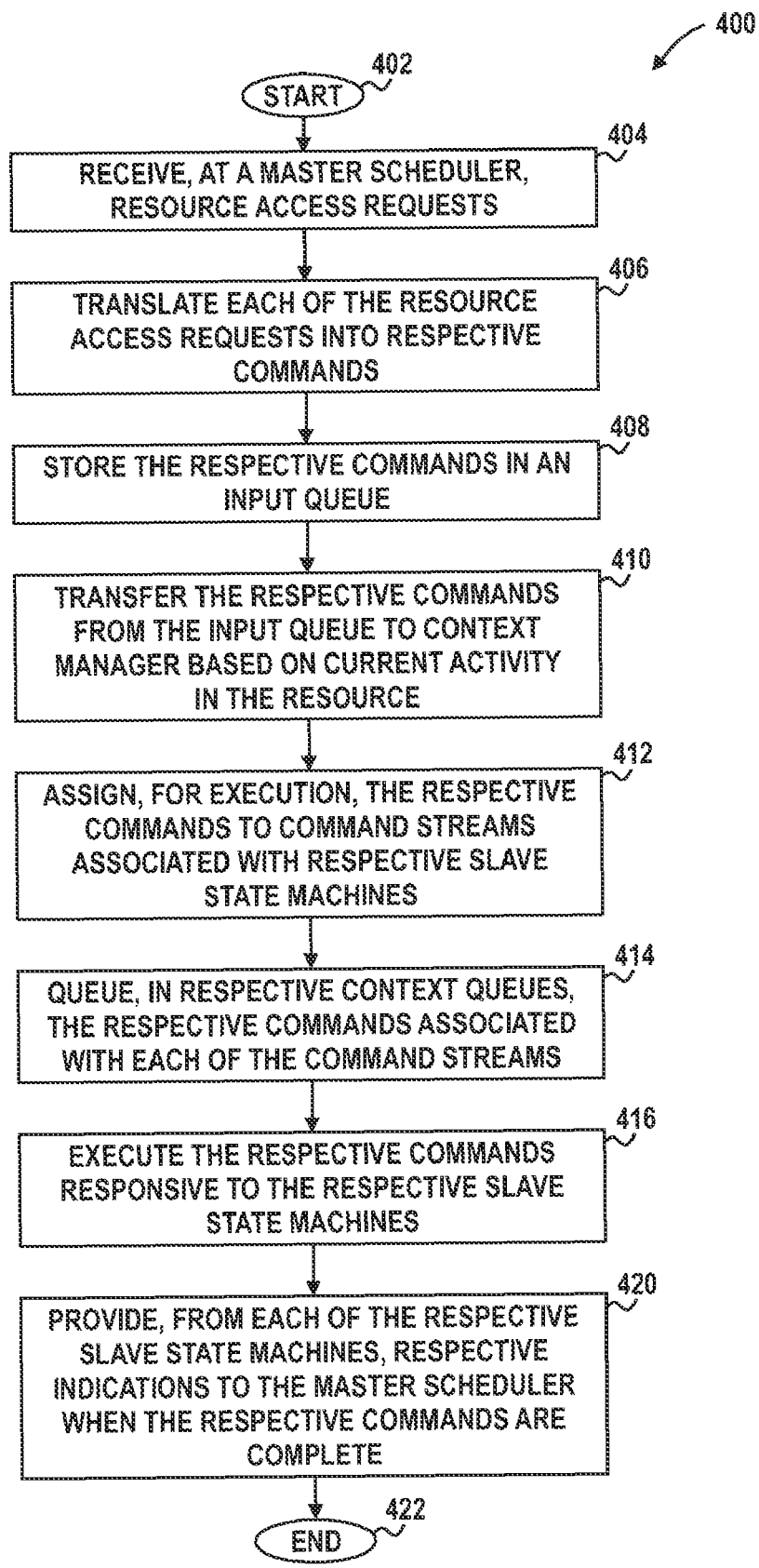
FIG. 4 shows an example flowchart of a process for sharing resources among multiple devices in a processor system that may be implemented in the memory controller of FIG. 2.

With reference to FIG. 4, an example process 400 for accessing a resource, e.g., a memory, according to an embodiment of the present disclosure is depicted. Without loss of generality, the process 400 is described with respect to the circuit 300 of FIG. 3. The process 400 is initiated in block 402, at which point control transfers to block 404. In block 404, resource access requests (e.g., DRAM read or write requests) are received at the master scheduler 202 (see FIG. 3). Next, in block 406, the resource access requests are translated into respective slave state machine work orders (that include respective commands) by the DRAM page table 302. Then, in block 408, the work orders are temporarily stored in the input queue 306. Next, in block 410, the respective work orders are transferred from the input queue 306 to the context manager 310, based on current activity in the resource (as monitored by the arbiter 304). Then, in block 412, the respective work orders are assigned (by the context manager 310) to command streams associated with respective ones of the slave SMs 320 for execution.

Next, in block 414, the respective commands associated with each of the command streams are queued in respective ones of the context queues 312, which at any given point in time may be bound to one of the SMs 320 or may be unassigned. In this embodiment, each of the context queues 312 provides a queue for a different one of the command streams (and correspondingly, a different one of the SMs 320). Then, in block 416, the respective commands are executed responsive to the respective slave SMs 320. That is, the SMs 320 are configured to control execution of assigned commands, i.e., open a memory page, read/write data from/to the memory page, and close the memory page, etc. Next, in block 420, when the respective commands are complete, respective indications are provided, from each of the respective slave SMs 320, to the master scheduler 202 (more specifically, the arbiter 304). Following block 420, control transfers to block 422, where the process 400 terminates.

Accordingly, techniques have been described herein that facilitate accessing a resource, e.g., a memory, in a relatively straight forward efficient manner. In one or more embodiments, a scalable resource controller is disclosed that maintains reduced resource transaction state information. The resource controller may be scaled for a desired performance level. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of accessing a resource, comprising:
receiving, at a master scheduler, resource access requests;
translating the resource access requests into respective slave state machine work orders that each include one or more respective commands;
assigning, for execution, the one or more respective commands to command streams associated with respective slave state machines;
executing the one or more respective commands responsive to the respective slave state machines;
storing, at an input queue, the respective commands;
providing, from a context manager, an indication to an arbiter as to whether the multiple slave state machines are available;
assigning, at the context manager, each of the respective commands to one of multiple context queues; and
selecting, at the arbiter, one of the respective commands from the input queue for transfer to one of the multiple context queues based on whether any of the multiple slave state machines are available.

2. The method of claim 1, wherein the assigning further comprises:
queuing, in respective context queues, the respective slave state machine work orders associated with each of the command streams.

3. The method of claim 2, further comprising:
storing the respective slave state machine work orders in an input queue; and
transferring the respective slave state machine work orders from the input queue to the respective context queues based on current activity in the resource, wherein each of the respective context queues provides a queue for a different one of the command streams.

4. The method of claim 1, further comprising:
providing, from each of the respective slave state machines, respective indications to the master scheduler when the respective commands are complete.

5. The method of claim 4, further comprising:
assigning additional ones of the respective slave state machine work orders to the respective slave state machines responsive to the respective indications.

6. The method of claim 1, wherein the resource is a memory and the executing the one or more respective commands responsive to the respective slave state machines corresponds to reading data from the memory or writing data to the memory.

7. The method of claim 1, wherein the resource is a memory and the number of slave state machines employed is scalable to provide up to a maximum channel configuration of the memory dependent upon a desired performance level.

8. The method of claim 1, further comprising:
tracking, via a memory page table, open pages in a memory; and
translating, via the memory page table, the resource access requests into the respective slave state machine work orders that include the one or more respective commands.

9. A memory controller, comprising:
a master scheduler configured to translate memory transaction requests into respective commands and assign associated ones of the respective commands to a same one of respective command streams, the master scheduler including:
an input queue configured to store the respective commands;
an arbiter; and
a context manager coupled to the arbiter, the context manager providing an indication to the arbiter as to whether the multiple slave state machines are available, wherein the context manager is further configured to assign each of the respective commands to one of multiple context queues, and wherein the arbiter is further configured to select one of the respective commands from the input queue for transfer to one of the multiple context queues based on whether any of the multiple slave state machines are available; and
multiple slave state machines coupled to the master scheduler, wherein each of the multiple command streams is associated with one of the multiple slave state machines.

10. The memory controller of claim 9, wherein the master scheduler further comprises:
a memory page table configured to track open pages in a memory, wherein the memory page table is further configured to translate the memory transaction requests into respective slave state machine work orders that include the respective commands.

11. The memory controller of claim 9, wherein the arbiter configured to select, for transfer to one of the multiple slave state machines, one of the respective commands from the input queue based on, at least in part, whether the respective commands stored in the input queue are associated with one of the open pages in the memory.

12. The memory controller of claim 11, wherein each of the multiple context queues are utilized to queue one of the respective command streams.

13. The memory controller of claim 12, wherein the memory page table is further configured to track availability of the multiple slave state machines.

14. A processor system, comprising:
a central processing unit; and
a memory controller coupled to the central processing unit, the memory controller comprising:
a master scheduler configured to translate memory transaction requests into respective commands and assign associated ones of the respective commands to a same one of multiple command streams; and
multiple slave state machines coupled to the master scheduler, wherein each of the respective command streams is associated with one of the multiple slave state machines;
wherein the master scheduler includes:
an input queue configured to store the respective commands;
an arbiter; and a context manager coupled to the arbiter, the context manager providing an indication to the arbiter as to whether the multiple slave state machines are available, wherein the context manager is further configured to assign each of the respective commands to one of multiple context queues, and wherein the arbiter is further configured to select one of the respective commands from the input queue for transfer to one of the multiple context queues based on whether any of the multiple slave state machines are available.

15. The processor system of claim 14, wherein the master scheduler further comprises:

a memory page table configured to track open pages in a memory, wherein the memory page table is further configured to translate the memory transaction requests into respective slave state machine work orders that include the respective commands.

16. The processor system of claim 15, wherein the memory page table is further configured to track availability of the multiple slave state machines.

17. The processor system of claim 16, wherein the arbiter configured to select, for transfer to one of the multiple slave state machines, one of the respective commands from the input queue based on, at least in part, whether the respective commands stored in the input queue are associated with one of the open pages in the memory.

18. The processor system of claim 17, wherein each of the multiple context queues are utilized to queue one of the respective command streams.

* * * * *